United States Patent [19]
Rosen

[11] Patent Number: 5,927,766
[45] Date of Patent: *Jul. 27, 1999

[54] LATCHING MECHANISM FOR A MOTOR CONTROL CENTER

[75] Inventor: Gary M. Rosen, Clemson, S.C.

[73] Assignee: Square D. Company, Palatine, Ill.

[ * ] Notice: This patent is subject to a terminal disclaimer.

[21] Appl. No.: 08/884,078

[22] Filed: Jun. 27, 1997

[51] Int. Cl.⁶ .................................................. E05C 19/10
[52] U.S. Cl. ............................................ 292/101; 292/203
[58] Field of Search ................................... 292/101, 102, 292/108, 109, 95, 202, 203, 210

[56] References Cited

U.S. PATENT DOCUMENTS

| | | |
|---|---|---|
| 1,495,372 | 5/1924 | Witten . |
| 1,513,234 | 10/1924 | Fritsch . |
| 1,575,493 | 3/1926 | Lang . |
| 1,772,177 | 8/1930 | Dake . |
| 2,090,638 | 8/1937 | Romine . |
| 3,482,143 | 12/1969 | Stark . |
| 3,877,739 | 4/1975 | Cowen ...................................... 292/101 |
| 4,040,653 | 8/1977 | Takahashi ............................... 292/202 |
| 4,397,487 | 8/1983 | Guttman .................................. 292/202 |
| 4,586,736 | 5/1986 | Dougherty .............................. 292/202 |
| 5,489,131 | 2/1996 | Blom ........................................ 292/101 |
| 5,622,395 | 4/1997 | Shine ....................................... 292/210 |

*Primary Examiner*—Steven Meyers
*Assistant Examiner*—Gary Estremsky
*Attorney, Agent, or Firm*—Larry I. Golden; Kareem M. Irfan

[57] ABSTRACT

An improved latch mechanism is provided for use in a motor control center having a door and a frame which the door cooperatively closes onto. The latch mechanism is capable of securing the door against the frame and is rotatable between an OPEN position and a CLOSED position. The latch mechanism includes a body portion, rotatably coupled to the door, capable of engaging a slot disposed in the frame for securing the door against the frame. A stop, disposed on the body portion, is provided for limiting the rotation of the body portion.

18 Claims, 5 Drawing Sheets

LATCHING MECHANISM FOR A MOTOR CONTROL CENTER

FIELD OF THE INVENTION

This invention relates generally to motor control centers and, more specifically, to an improved latch for use with such motor control centers.

BACKGROUND OF THE INVENTION

Control units which are used to control the distribution of electric current to a plurality of electric loads, such as a number of motors, from a central location, are generally housed in compartmented structures called control centers. Such control centers are formed of a group of individual control center sections each of which includes a plurality of cells or compartments wherein the control units are installed and secured therein with doors. Each door is secured closed with a pawl latch having a tab extending therefrom which is inserted into a slot disposed in the frame of the control center. If the control center experiences a short circuit fault, which creates instantaneous pressure inside the control center, these tabs may be sheared off. Additionally, conventional pawl latches occasionally become ineffective during the short circuit fault because they may move out of position and vacate the slot during the fault. Another problem with conventional pawl latches is that they spin freely about a pin thereby making it difficult to determine the position they are in, hence causing confusion as to whether the door is secured closed or not. Therefore, there is a need to provide a durable latch that prevents the door from opening during a short circuit fault and is capable of providing feedback as to what position it is in.

SUMMARY OF THE INVENTION

It is a general object of the present invention to provide a latch for securing a door of a motor control center in the closed position.

It is a more specific object of the present invention to provide a latch having a hook portion which engages a slot in a frame member of a motor control center for preventing a door of the control center from opening.

In accordance with a preferred embodiment of the present invention an improved latch mechanism is provided for use in a motor control center having a door and a frame which the door cooperatively closes onto. The latch mechanism is capable of securing the door against the frame and includes a body portion rotatably coupled to the door. A hook portion extends substantially longitudinal from the body portion and is capable of engaging a slot disposed in the frame of the motor control center.

In accordance with another aspect of the present invention an improved latch mechanism is provided for use in a motor control center having a door and a frame which the door cooperatively closes onto. The latch mechanism is capable of securing the door against the frame and is rotatable between an OPEN position and a CLOSED position. The latch mechanism includes a body portion, rotatably coupled to the door, capable of engaging a slot disposed in the frame for securing the door against the frame. A stop, disposed on the body portion, is provided for limiting the rotation of the body portion.

BRIEF DESCRIPTION OF THE DRAWINGS

Other objects and advantages of the invention will be apparent from the following detailed description and the accompanying drawings in which.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Reference is made to co-pending U.S. patent application Ser. No. 08/883,906, entitled "An Improved Latching Mechanism for a Motor Control Center" owned by the same assignee and filed concurrently herewith.

Figure 1:
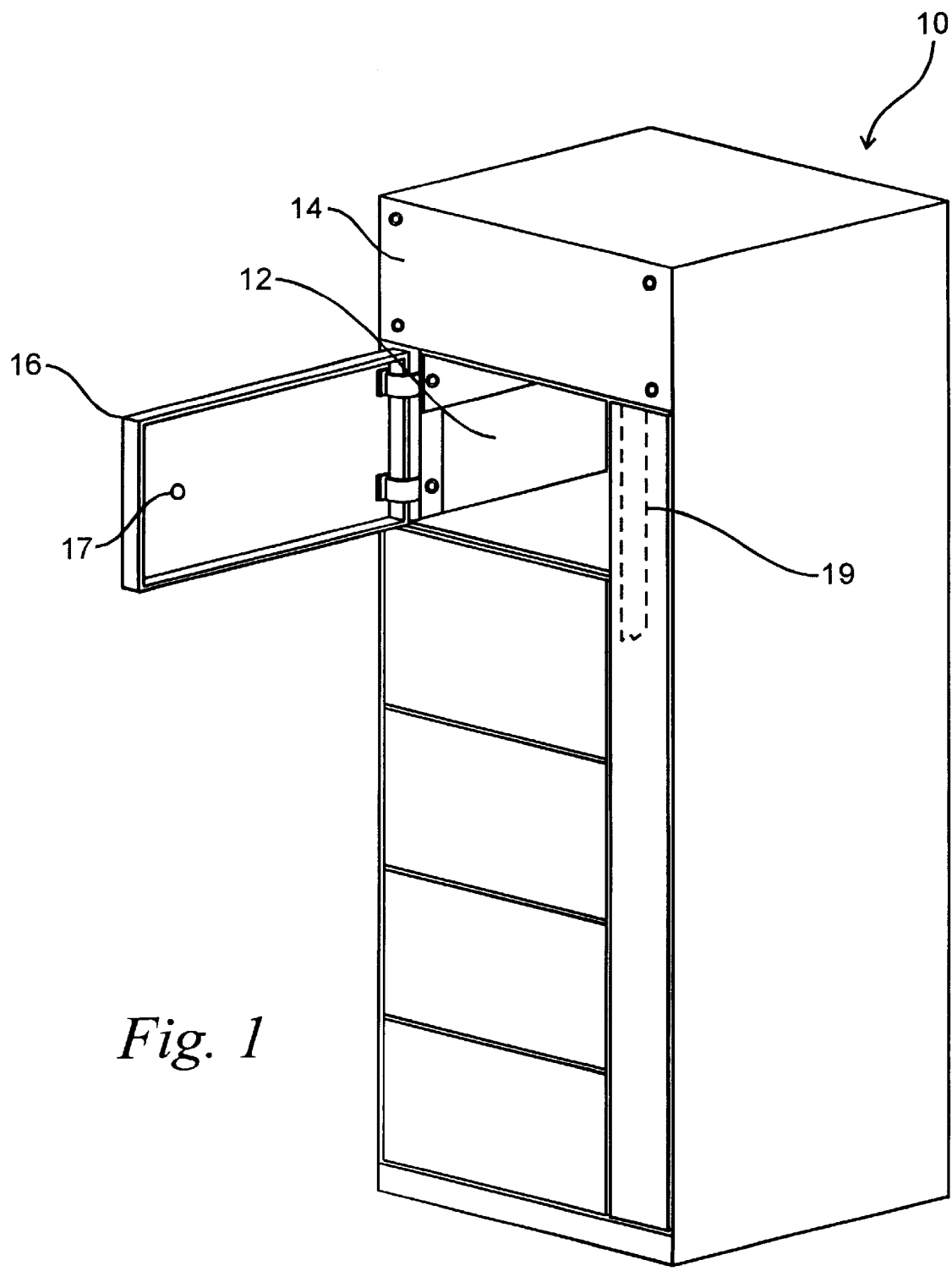
FIG. 1 is a representation isometric view of a control center section.

By way of background information, referring initially to FIG. 1 of the drawings, there is illustrated a motor control center section 10 which may, for example, be of the type described in U.S. Pat. No. 3,482,143, issued Dec. 11, 1967, entitled "Unit Mounting Pan for an Electrical Enclosure Structure" or U.S. Pat. No. 3,495,135, issued Dec. 11, 1967, entitled "Electrical Control Center Structure Having Symmetrical Parts"; both patents are assigned to Square D Company and the disclosures therein are incorporated herein by reference.

Each motor control section 10 contains individual control units (not shown) which may, for example, be of the type described in U.S. Pat. No. 5,510,960, issued Apr. 23, 1996, entitled "Connector Assembly for a Motor Control Unit" which is assigned to Square D Company and the disclosure therein is incorporated herein by reference. These control units are positioned inside a control unit compartment 12. Several motor control sections 10 are generally placed side by side in an industrial location to control the electrical equipment of a plant. A horizontal bus bar compartment cover 14, at the top of the control center 10 section, covers the area which houses horizontal bus bars (not shown) and their connection to vertical bus bars (not shown). A supply source provides electrical power through the horizontal bus bars and vertical bus bars to the individual control units. Each control unit is enclosed in its control compartment 12 with a door 16 having an aperture 17 disposed therein. The door 16 has a latch assembly 18, which is shown in more detail in FIG. 2, that is received in a frame 19, which is shown in phantom, for securing the door in a CLOSED position.

Figure 2:
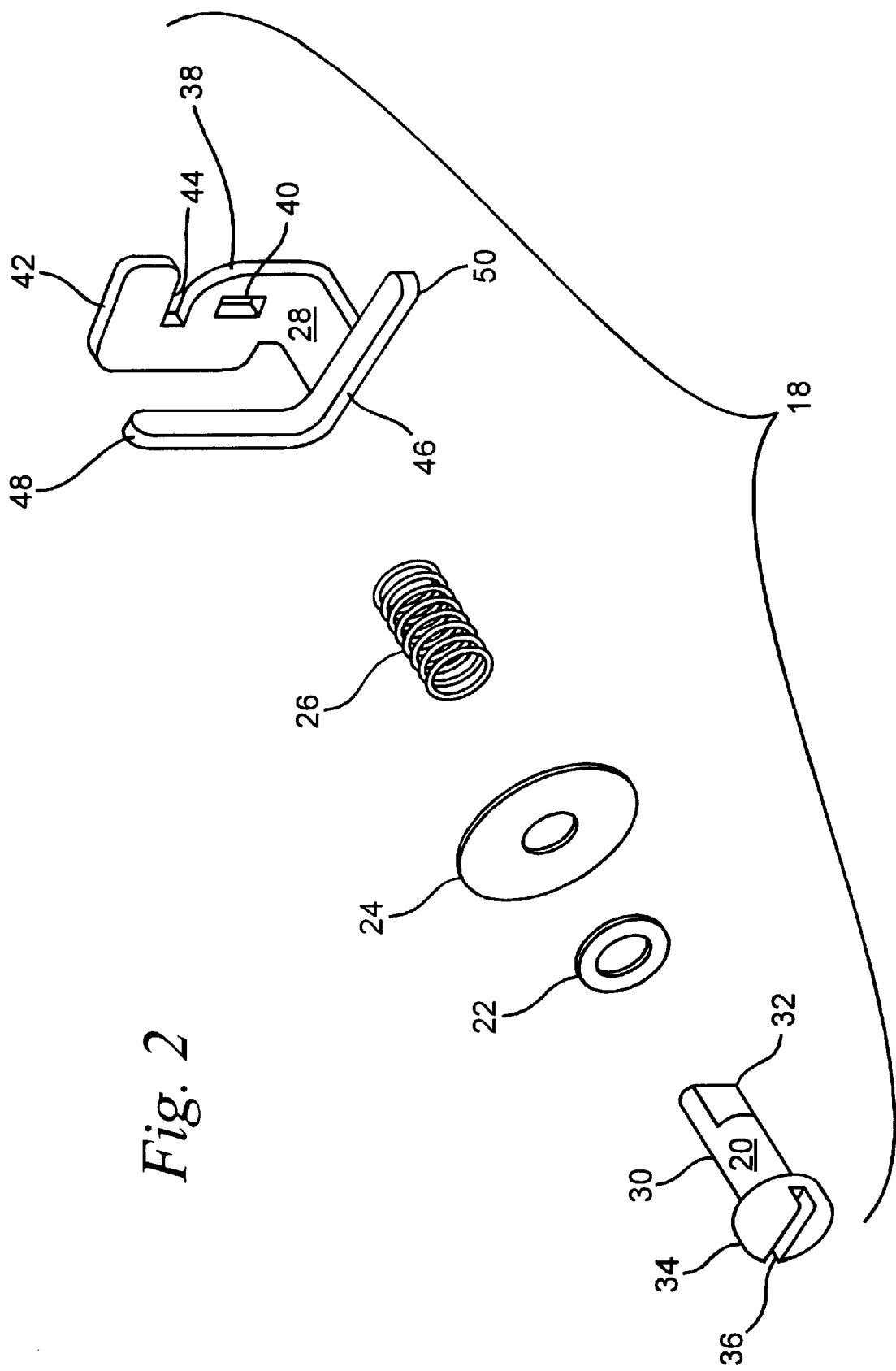
FIG. 2 is an assembly drawing of a latch assembly including a pawl latch in accordance with the present invention.

FIG. 2 shows the latch assembly 18 in accordance to the preferred embodiment of the present invention, which includes a bolt 20, first washer 22, second washer 24, compression spring 26 and pawl latch 28. The bolt includes a shaft 30 having a flat end portion 32 at one end and a head 34 disposed at its other end. The head 34 has a slot 36 disposed therein for accepting the working end of a tool, such as a screw driver (not shown). The first and second washers 22 and 24 are made of wear resistant and non-abrasive material, such as nylon, to prevent environmental elements from entering the motor control section and to prevent rotational movement of the pawl latch 28 from wearing paint off of the door 16.

The pawl latch 28 in accordance to the preferred embodiment of the present invention is a one piece formed part which includes a body portion 38 having a flat sided aperture 40 therein which receives the flat end portion 32 of the bolt 20. A hook portion 42 extends generally longitudinally from the body portion 38 and includes a ramped edge 44. A L-shaped stop member 46 extends substantially perpendicular from the body portion 38 and includes a close stop 48 and an open stop 50.

Figure 3:
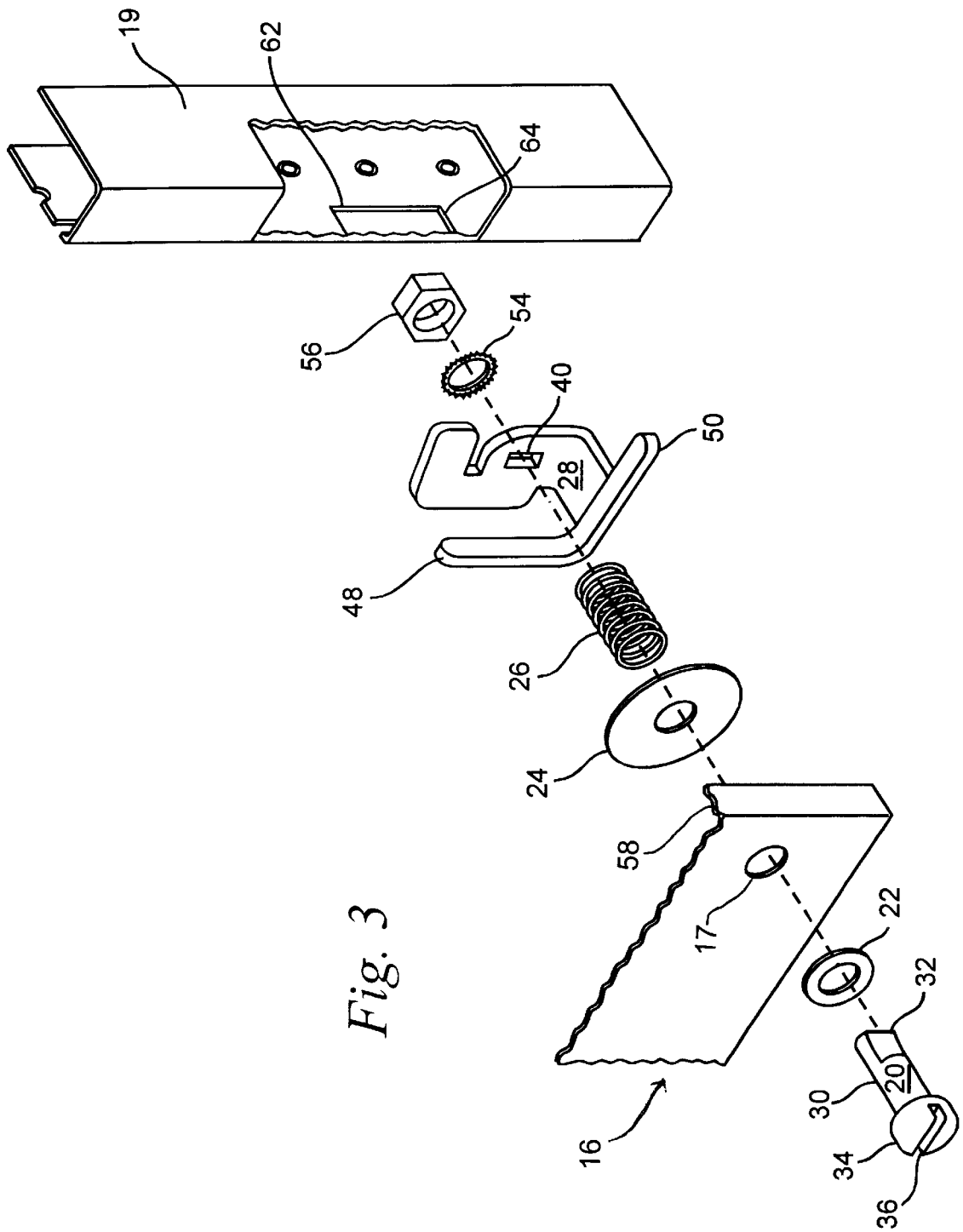
FIG. 3 is an assembly drawing the latch assembly.
Figure 4:
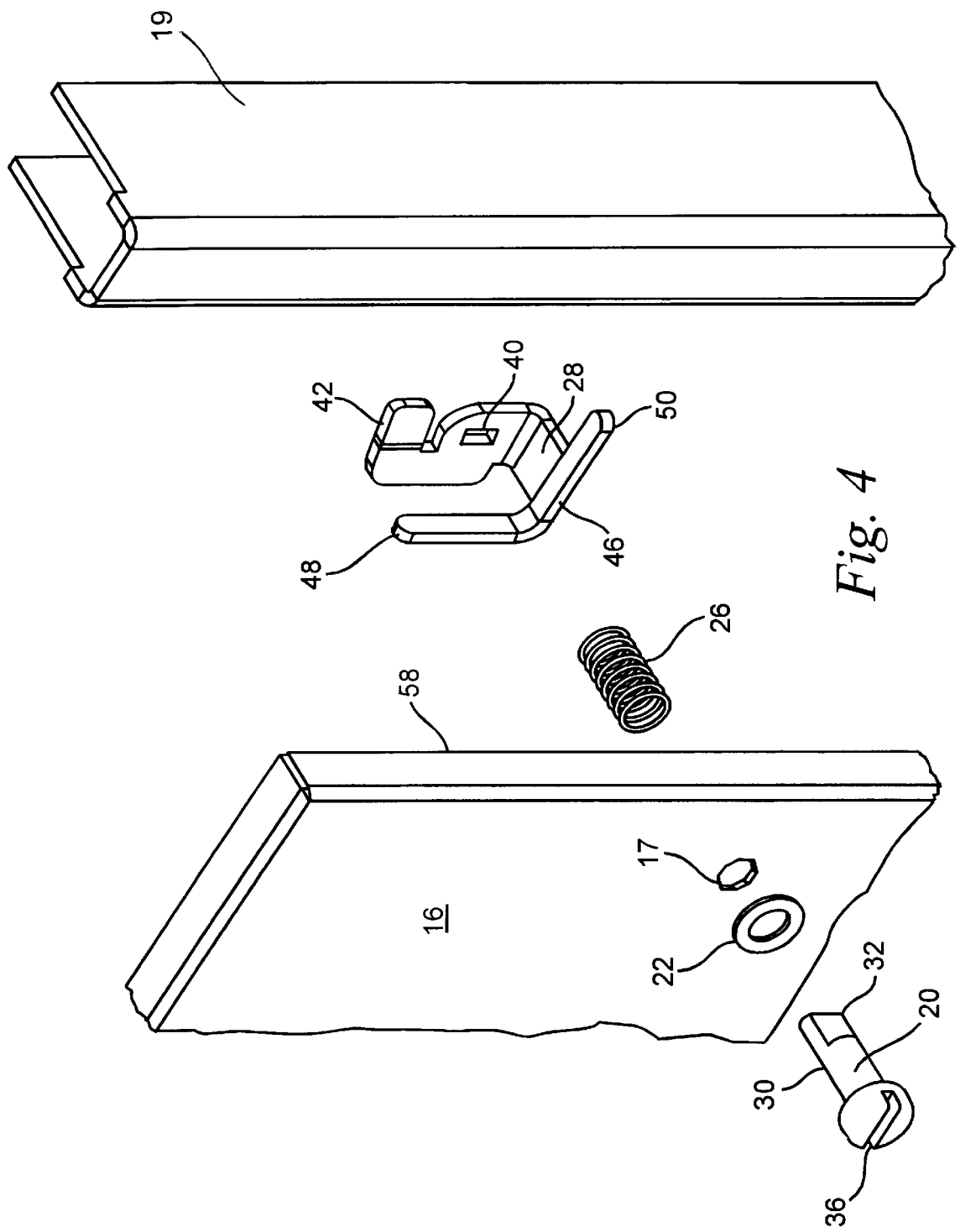
FIG. 4 is an assembly drawing the latch assembly.

Referring to FIGS. 3 and 4, the installation of the latch assembly 18 (FIG. 2) will now be described. The shaft 30 of the bolt 20 is inserted through the first washer 22 and the aperture 17 in the door 16. The second washer 24 and then the spring 26 are positioned around the shaft 30. The aperture 40 of the pawl latch 28 is positioned onto the flat end 32 of the bolt 20. Finally, a star washer 54 is inserted onto the flat end 32 and a nut 56 is threaded onto the flat end.

Figure 5:
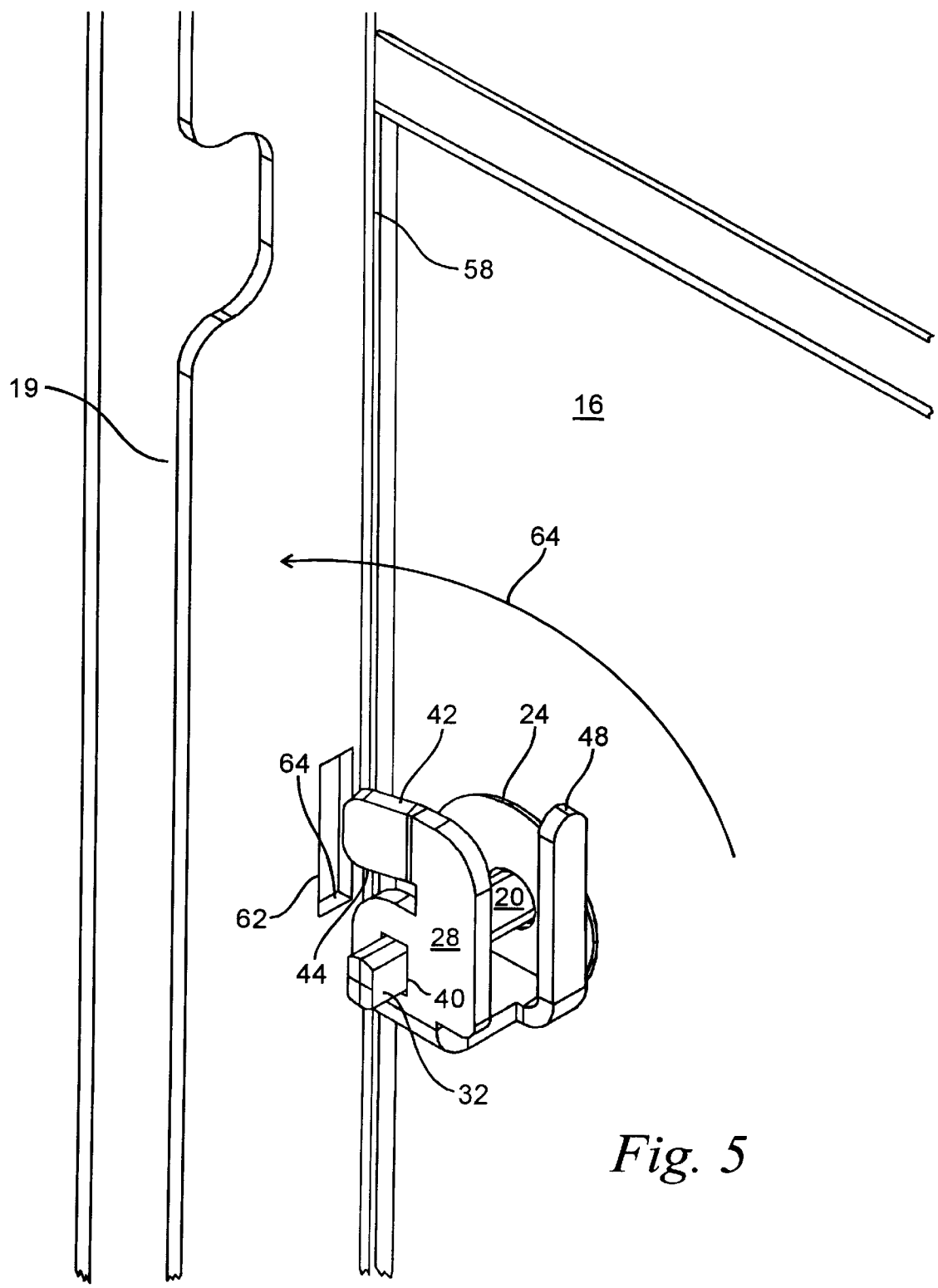
FIG. 5 is an isometric view of the pawl latch secured to a door of the motor control section.

FIG. 5 shows the latch assembly secured onto the back side, or inside, of the door 16. As shown, the door 16 includes a flange portion 58 which engages the frame 19 of the control unit when the door is in the CLOSED position. The frame 19 includes a slot 62 therein for receiving the hook portion 42 of the pawl latch 28.

The operation of the interlock assembly will now be discussed. It should be noted that the rotational directions described hereinbelow are from a reference point that is in front of the door 16. FIG. 5 shows the door 16 disposed adjacent the frame 19 in the CLOSED position and the pawl latch 28 in an OPEN position. The pawl latch 28 is rotated into the CLOSED position by positioning the working end of a screw driver (not shown) into the slot 36 (FIG. 2) and turning it in the clockwise direction. As the screwdriver is rotated in the clockwise direction, the bolt 20 rotates in the clockwise direction which forces the pawl latch 28 to rotated in the clockwise direction as indicated by the direction arrow 64. The bolt 20 continues to be rotated in the clockwise direction until the hook portion 42 travels into the slot 62 so that the ramped edge 44 is positioned behind the frame 19. The bolt 20 continues to be rotated in the clockwise direction until the close stop 48 engages the door flange 58. To move the pawl latch 28 into the OPEN position and disengage the hook portion 42 from the slot 62, the screw driver is rotated in the counterclockwise direction so that the bolt 20 rotates in the counterclockwise direction thereby forcing the pawl latch 28 to rotate in the counterclockwise direction. This counterclockwise rotation of the pawl latch 28 removes the hook portion 42 from the slot 62. The bolt continues to be rotated counterclockwise until the open stop 50 engages the flange 58 thereby fully disengaging the hook portion 42 from the slot 62, and hence allowing the door 16 to be moved away from the frame 19 into an OPEN position.

The ramped edge 44 is provided so that the pawl latch 28 may be rotated into the CLOSED position when the door is mis-aligned. The ramp provides a surface that engages, if necessary, a slot edge 64 of the slot 62 when the pawl latch 28 is rotated in the clockwise direction. As the hook portion 44 is rotated into the slot 62 the ramp engages the slot edge 64 and slides along the slot edge 64.

The hook portion 42 of the present invention provides the advantage of assuring that the pawl latch 28 remains in place during a short circuit fault that may occur in the motor control section, hence assuring that the door 16 remains in the CLOSED position. The spring 26 is provided to absorb some of the pressure that is created in the motor control section when a short circuit fault occurs.

Additionally, the close stop 48 and the open stop 50 are provided to limit the rotational travel of the bolt 20 and assist in providing a definitive feedback as to the position of the pawl latch 28. For example, the pawl latch 28 only rotates between the OPEN, or disengaged, position and the CLOSED, or engaged, position because the open stop 50 engages the door flange 58 when the pawl latch 28 is in the OPEN position and the close stop 48 engages the door flange 58 when the pawl latch is in the CLOSED position. Positive feedback is provided by the slot 36 in the bolt 20. For example, the slot is horizontal when the pawl latch 28 is in the OPEN position and is vertical when pawl latch 28 is in the CLOSED position.

While it has been shown and described what is at present considered the preferred embodiment of the invention, it will be obvious to those skilled in the art that various changes and modifications may be made therein without departing from the scope of the invention as defined by the appended claims. For example, the flat end of the bolt may be disposed in the flat sided aperture in a position such that the slot in the head of the bolt is in the vertical position when the pawl latch is in the OPEN position and in the horizontal position when the pawl latch is in the CLOSED position.

What is claimed is:

1. A latch mechanism for use in a motor control center having a door and a frame which the door cooperatively closes onto, the frame defined by an inner and an outer surface having a slot disposed therethrough, the latch mechanism capable of securing the door against the frame and is rotatable between an OPEN position and a CLOSED position, the latch mechanism comprising:

a body portion adapted to be rotatably coupled to the door and adapted to engage the slot disposed in the frame for securing the door against the frame;

a hook member integrally formed with and extending outwardly from the periphery of the body portion, the hook member partially defined by an edge adapted to engage the outer surface of the slot as the hook member passes through the slot when the body portion is rotated to a closed position; and a stop member being L-shaped and extending from the body portion for limiting rotation of the body portion, the stop member extending outwardly from the body portion in a direction perpendicular to the plane of the hook member so as to lie in a plane parallel with the pivotal axis of the hook member, the stop member having a portion defining an open stop means for limiting excess rotational movement of the body portion in an unlatching direction and a further portion bent substantially to the open stop means to form a close stop means which lies in a plane perpendicular to the plane of the hook member and perpendicular to the plane of the open stop means for limiting excess rotational movement of the body portion in a latching direction.

2. The latch mechanism according to claim 1, wherein the stop member includes a second end, wherein the second end engages the door when the latch mechanism is in the OPEN position and the distal end engages the door when the latch mechanism is in the CLOSED position.

3. The latch mechanism according to claim 2, wherein the stop member being substantially L-shaped extends generally perpendicular from the body portion.

4. The latch mechanism according to claim 1, wherein the body portion further including an aperture therein for accepting one end of a bolt.

5. The latch mechanism according to claim 1, wherein the edge of the hook member defines a ramp which increasingly draws the door in closer proximity to the frame as the body portion is rotated to a closed position.

6. A latch assembly disposed on a door of a motor control center capable of engaging a frame member of the motor control unit for securing the door to the frame, the frame defined by an inner and an outer surface having a slot disposed therethrough, the latch assembly comprising:

a bolt rotatably disposed in an aperture in the door wherein the bolt having flat sides on one end;

a latch having a body portion, coupled to the bolt, and a stop member, the latch being capable of rotating between an OPEN position and a CLOSED position wherein the stop member stops the latch in the OPEN position and stops the latch in the CLOSED position;

a hook member integrally formed with and extending outwardly from the periphery of the body portion, the hook member partially defined by an edge adapted to engage the outer surface of the slot as the hook member passes through the slot when the body portion is rotated to a CLOSED position; and the stop member being L-shaped and extending from the body portion for limiting rotation of the body portion, the stop member extending outwardly from the body portion in a direction perpendicular to the plane of the hook member so as to lie in a plane parallel with the pivotal axis of the hook member, the stop member having a portion defining an open stop means for limiting excess rotational movement of the body portion in an unlatching direction and a further portion bent substantially to the open stop means to form a close stop means which lies in a plane perpendicular to the plane of the hook member and perpendicular to the plane of the open stop means for limiting excess rotational movement of the body portion in a latching direction.

7. The latch assembly according to claim 6, wherein the stop member includes a second end which engages the door when the latch is in an OPEN position and the distal end which engages the door when the latch is in a CLOSED position.

8. The latch assembly according to claim 7, wherein the stop member is substantially L-shaped.

9. The latch assembly according to claim 6, further including indication means for indicating the position of the latch.

10. The latch assembly according to claim 9, wherein the indication means includes a slot disposed in the bolt.

11. The latch assembly according to claim 10, wherein the slot is one position when the latch is in the CLOSED position and is in another position when the latch is in the OPEN position.

12. The latch assembly according to claim 6, wherein the edge of the hook member defines a ramp which increasingly draws the door in closer proximity to the frame as the body portion is rotated to a closed position.

13. A motor control center comprising:

a frame defined by an inner and an outer surface having a slot disposed therethrough;

a motor control unit disposed in the frame;

a door for enclosing the motor control unit within the motor control center;

a latch having a body portion, coupled to the door and rotatable between an OPEN and a CLOSED position, the latch having an open stop member which engages the door when the latch is in the OPEN position and a close stop member which engages the door when the latch is in the CLOSED position;

a hook member integrally formed with and extending outwardly from the periphery of the body portion, the hook member partially defined by an edge which engages the outer surface of the slot as the hook member passes through the slot when the body portion is rotated to the CLOSED position; and the stop members each extending outwardly from the periphery of the body portion in planes perpendicular to that of the hook member and to each other, the close stop member having a distal end for engaging the inner surface of the frame when the body portion is rotated to the CLOSED position so that the engagement of the hook member and the engagement of the close stop member occur on parallel surfaces.

14. The motor control center according to claim 13, wherein the stop member includes a second end which engages the door when the latch is in the OPEN position and the distal end which engages the door when the latch is in the CLOSED position.

15. The motor control center according to claim 14, wherein the stop member is substantially L-shaped and extends generally perpendicular from the latch.

16. The motor control center according to claim 13, further including indication means for indicating the position of the latch.

17. The motor control center according to claim 16, wherein the indication means includes a slot disposed at one end of a bolt disposed in the door.

18. The motor control center according to claim 13, wherein the edge of the hook member defines a ramp which increasingly draws the door in closer proximity to the frame as the body portion is rotated to a closed position.

* * * * *